United States Patent [19]

Jones et al.

[11] Patent Number: 5,062,188
[45] Date of Patent: Nov. 5, 1991

[54] TRANSFER APPARATUS FOR MOVING PALLETS USING HYDRAULIC LIFT

[75] Inventors: Joel W. Jones; John Eldracher, both of Windsor, Canada

[73] Assignee: Tri-Way Machine Ltd., Windsor, Canada

[21] Appl. No.: 640,829

[22] Filed: Jan. 14, 1991

[51] Int. Cl.⁵ .................. B23Q 7/00; B65G 47/00
[52] U.S. Cl. ................................. 29/33 P; 29/563; 198/465.1; 198/741
[58] Field of Search .............. 29/33 P, 563; 409/219, 409/227; 198/345.3, 345.2, 345.1, 465.1, 465.2, 774.2, 774.1, 740, 741, 346.3

[56] References Cited

U.S. PATENT DOCUMENTS

| | | | |
|---|---|---|---|
| 4,394,897 | 7/1983 | Brems | 198/345.3 |
| 4,868,960 | 9/1989 | Takagi et al. | 29/33 P |
| 4,901,412 | 2/1990 | Jones | 29/33 P |

FOREIGN PATENT DOCUMENTS 3828310  3/1990  Fed. Rep. of Germany ... 198/345.3

Primary Examiner—William Briggs
Attorney, Agent, or Firm—Shoemaker and Mattare, Ltd.

[57] ABSTRACT

In an automated machine tool assembly where a plurality of work stations are interconnected by slide rails on which pallets can slide, the pallets having workpieces affixed to them, with at least one transfer bar for engaging a pallet and sliding the pallet longitudinally along the slide rails, a hydraulic lift and monitoring system includes a plurality of hydraulic cylinders in the transfer bar, a plunger in each cylinder, and a first source of pressurized fluid which urges each plunger upwardly against a pallet. The first source of pressurized fluid is adjustable so as to pre-set the pressure with which the plungers are urged upwardly. A second source of fluid under pressure is linked through the cylindrical chambers in series to a pressure-sensitive switch such that, if a plunger fails to rise to its uppermost position when not loaded with a pallet, the operator is given a signal from the switch that a malfunction exists.

24 Claims, 4 Drawing Sheets

TRANSFER APPARATUS FOR MOVING PALLETS USING HYDRAULIC LIFT

This invention relates generally to machine tool assemblies, and has to do particularly with an improved apparatus for moving pallets in an automated machine tool assembly.

BACKGROUND OF THIS INVENTION

It is now common to use automated machine tool equipment to make parts for use in the automotive and other industries. Typically, the parts are secured to pallets, which are heavy metal structures, and the pallets are moved from station to station so that the workpiece can receive the various machining operations. Most automated machine tool equipment now in use utilizes transfer bars which reciprocate in a horizontal direction for transferring pallets (and the mounted workpieces) from one station to the next.

Conventionally, there are two modes for transferring these pallets:

(a) a lift and carry mode, in which a plurality of pallets are picked up at the work stations, lifted a predetermined amount off the rails, advanced by the distance between stations, and set back down on the rails;

(b) a slide mode in which a plurality of pallets is trapped at both ends at the various work stations, and then advanced one station at the time by sliding them on the rails.

The advantage of (a) lies in the fact that by lifting and lowering the pallets, no rail wear occurs, thus maintaining the machining accuracy. The disadvantage of (a) lies in the fact that chips or swarf which are part of the machining process may get trapped under the pallets, resulting in inaccurate location at the work station, even to the extent of causing malfunction at the work stations.

The advantage of (b) lies in the fact that, by sliding the pallet, chips and swarf cannot enter between the pallet and the rails, but instead are pushed off the rails into so-called dirt grooves during transfer. The disadvantage of (b) obviously is due to this very sliding motion which causes rail wear from metal fatigue, hence loss of accuracy at the work stations.

PRIOR ART

The following patents are of general interest in this area:

U.S. Pat. No. 3,155,217, issued Nov. 3, 1964 to R.E. Cross

U.S. Pat. No. 4,148,400, issued Apr. 10, 1979 to R.E. Cross

U.S. Pat. No. 3,213,996, issued Oct. 26, 1965 to K.0. Tech

U.S. Pat. No. 4,360,097, issued Nov. 23, 1982 to J.H. Brems

U.S. Pat. No. 4,354,796, issued Oct. 19, 1982 to R.A. Bergman

U.S. Pat. No. 4,394,897, issued July 26, 1983 to J.H. Brems

U.S. Pat. No. 4,479,576, issued Oct. 30, 1984 to G. DiRossa

U.S. Pat. No. 3,237,759, issued Mar. 1, 1966 to F.A. Solski

U.S. Pat. No. 4,669,607, issued June 7, 1987 to A.C. Mason

U.S. Pat. No. 4,593,810, issued June 10, 1986 to K. Cook.

In my previously filed U.S Pat. No. 4,901,412, issued on Feb. 20, 1990, entitled "Method and Apparatus for Moving Pallets in Automated Machine Tool Assemblies", I set forth an ideal way of transferring pallets, namely to keep the pallets in contact with the rails, but to reduce friction between the rails and the pallets to a minimum by reducing the actual drag on the rail due to pallet assembly weight.

In that earlier invention, a series of spring-loaded plungers was used to relieve some of the weight of the pallets and the parts mounted thereon, during movement along the rails.

The arrangement described in the aforementioned patent application functions quite satisfactorily. However, I have since developed an improvement of that earlier system, the improvement being the object of the present application.

GENERAL DESCRIPTION OF THIS INVENTION

Generally, the improvement involves utilizing pressurized fluid to bias the plungers upwardly, and additionally to provide a pressurized fluid monitoring system adapted to signal the condition in which one or more of the plungers fails to reach an uppermost limit position when either the transfer bar is in a lower, retracted position, or there is no weight pressing downwardly on the plunger.

More particularly, this invention provides, for use with an automated machine tool assembly in which a plurality of work stations are interconnected by slide rails on which can slide a pallet to which a workpiece is affixed, and at least one transfer bar with means for engaging the pallet and sliding the pallet on the slide rails longitudinally thereof, a hydraulic lift and monitoring system which comprises:

a plurality of hydraulic cylinders provided as part of said transfer bar, in each cylinder a plunger of which a portion extends above the top of the transfer bar and is adapted to contact a pallet, a first source of fluid under pressure, conduit means ducting fluid from said first source to all said cylinders, said fluid acting to urge the plungers upwardly, a second source of fluid under pressure, pressure detecting means, passageway means linking said second source through all said cylinders in series and finally to said pressure detecting means in such a way that, when all the plungers are at or above a predetermined vertical position, pressurized fluid from said second source is available at the pressure detecting means, and when one or more plungers fail to reach said predetermined vertical position, pressurized fluid from said second source fails to reach said pressure detecting means.

Additionally, this invention provides an automated machine tool assembly with a hydraulic lift and monitoring system, the assembly comprising:

a plurality of work stations, slide rails interconnecting said work stations, at least one pallet slideable on said slide rails, said at least one pallet being such that a workpiece can be affixed thereto, at least one transfer bar with means for engaging the pallet and sliding the pallet on the slide rails longitudinally thereof, a plurality of hydraulic cylinders provided as part of said transfer bar, in each cylinder a plunger of which a portion extends above the top of the transfer bar and is adapted to contact a pallet, a first source of fluid under pressure, conduit means ducting fluid from said first source to all said cylinders, said fluid acting to urge the plungers upwardly, a second source of fluid under pressure, pressure detecting means, passageway means linking said second source through all said cylinders in series and finally to said pressure detecting means in such a way that, when all the plungers are at or above a predetermined vertical position, pressurized fluid from said second source is available at the pressure detecting means, and when one or more plungers fail to reach said predetermined vertical position, pressurized fluid from said second source fails to reach said pressure detecting means.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 4:
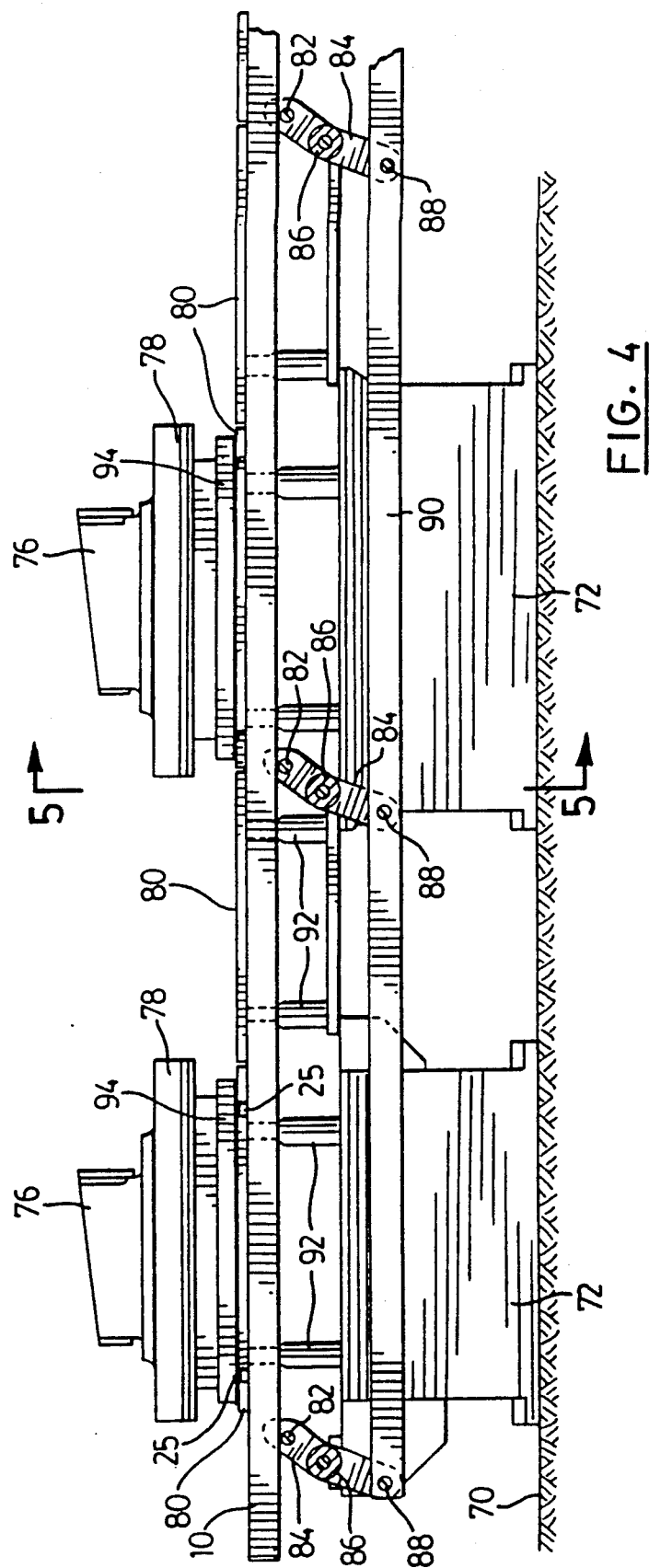
FIG. 4 is an elevational view of part of an automated machine tool installation with which this invention finds use.

Attention is first directed to FIG. 4, showing in somewhat schematic form a portion of an automated machine tool installation to which this invention can be applied.

In FIG. 4, a solid surface 70 supports a plurality of bases 72 forming the foundation of stations where a machine tool operation can be carried out on a workpiece. Two workpieces are shown at 76, these being firmly mounted on pallets 78. Fixed slide rails 80 are mounted on the bases 72, and are adapted to permit the pallets 78 to slide between the various work stations. The numeral 10 designates a transfer bar which supplies the force by which the pallets 78 are shifted between work stations. The transfer bar 10 is supported on rollers 82 which are in turn supported at the upper ends of swing arms 84, each of which is pivoted about a horizontal transverse swing axis defined by a boss 86, the swing axes all being stationary with respect to the bases 72. The opposite ends (the lower ends) of the swing arms 84 define an attachment location 88 at which the swing arms are secured to a drag link 90 which is adapted to be moved longitudinally of itself by hydraulic means (not shown). It will be appreciated that, as the drag link 90 is moved rightwardly in FIG. 4, the rollers 82 will swing counterclockwise in an upward and leftward arc, thus raising the transfer bar 10.

The numerals 92 designate slide rail supports.

Figure 5:
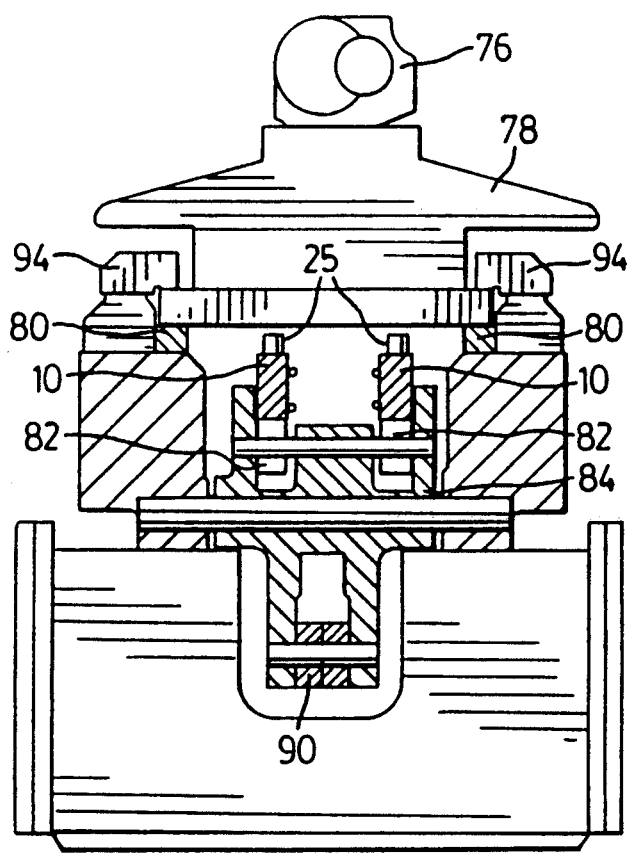
FIG. 5 is a lateral sectional view taken at the line 5—5 in FIG. 4.

In FIG. 5, the various parts are shown to a somewhat larger scale. FIG. 5 also shows clamps 94 for securing the pallet 78 in place. Seen in both FIGS. 4 and 5 are a plurality of plungers 25, of which the construction and function are described below.

Figure 2:
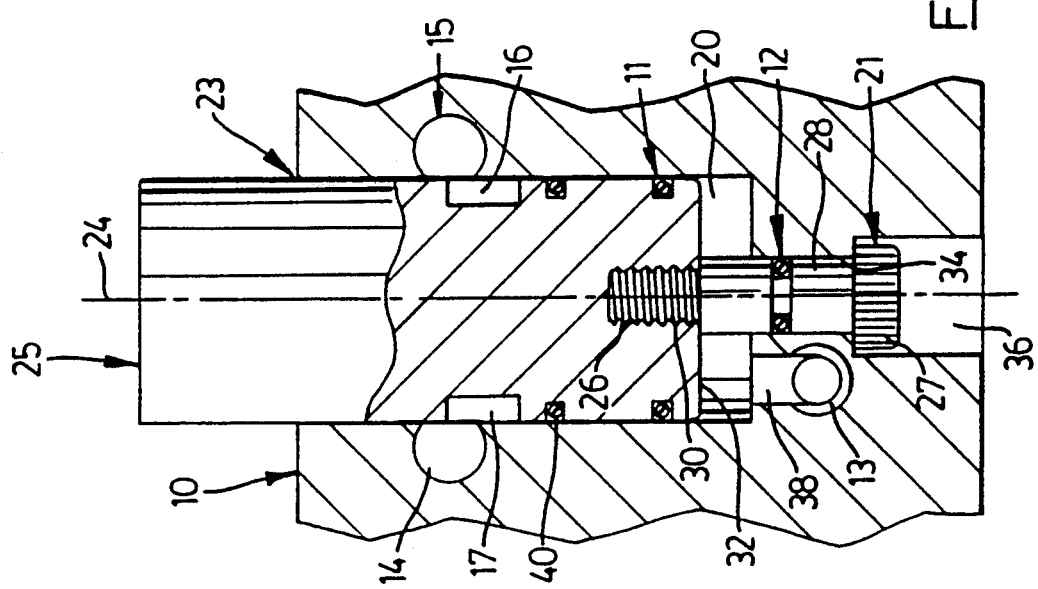
FIG. 2 is a view similar to FIG. 1, showing the plunger in the uppermost position with respect to the transfer bar.
Figure 1:
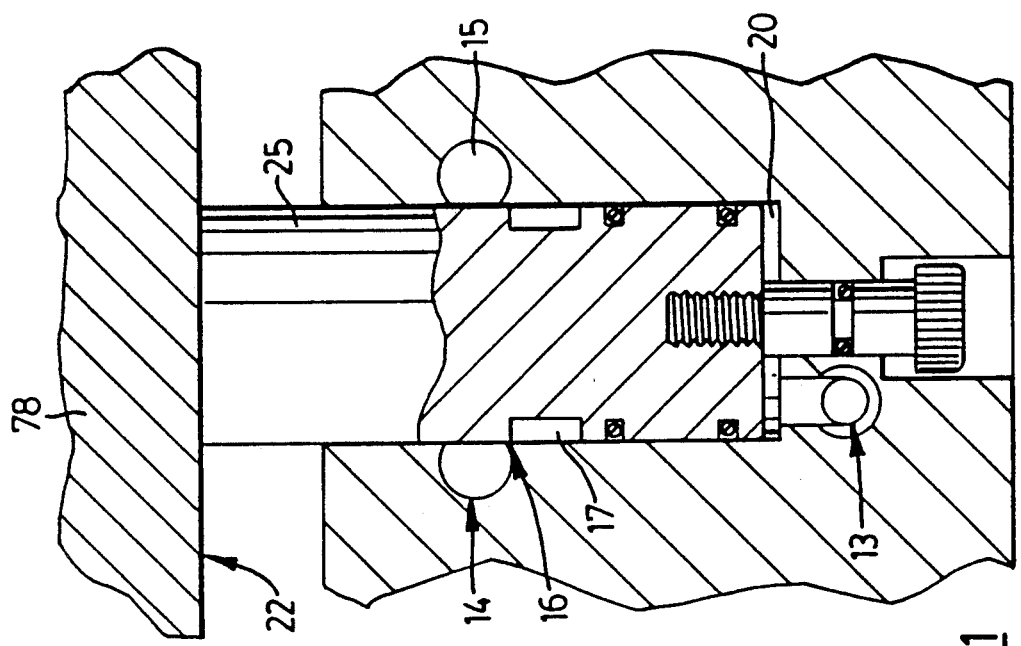
FIG. 1 is a vertical sectional view through the plunger of a transfer bar showing the plunger in the depressed or lower position.

Attention is now directed to FIG. 1, in which the transfer bar 10 is shown to be provided with a cylindrical chamber 20 with the axis 24 vertical. The cylindrical plunger is shown at 25, and is sized so as to reciprocate snugly but slideably in the vertical direction within the cylindrical chamber 20. The plunger 25 is a solid element having a central threaded bore 26 in its lower end, into which is threaded a bolt member 21 having a head 27, an unthreaded shank portion 28, and a threaded portion 30 adapted to be received within the threaded bore 26. The unthreaded shank portion 28 is larger in diameter than the threaded portion 30, thus defining a shoulder which snugly abuts the bottom surface 32 of the plunger 25. The unthreaded shank portion 28 is snugly received within a bore 34 which opens into a cylindrical cavity 36 receiving the which opens into a cylindrical cavity 36 receiving the head 27 of the bolt member 21. In FIG. 2, the bolt head 27 has reached its highest position within the cavity 36, thus determining the uppermost position of the plunger 25.

The transfer bar 10 includes, for each plunger 25, a bore 13 which communicates with the cylindrical chamber 20 along a passageway 38.

0-ring seals 11 and 12 are provided so as to eliminate loss of pressurized fluid from the cylindrical chamber 20 along the wall of the plunger 25 or the unthreaded shank 28, respectively A further 0-ring seal is provided at 40.

The plunger 25 has an annular groove 17 in its outer periphery, the illustrated groove being rectangular in section.

Provided in the transfer bar, for each plunger 25, are two blind boreholes constituting ports 14 and 15, each intersecting and communicating with the cylindrical chamber 20 in which the plunger 25 snugly moves.

It will be appreciated that, when the plunger 25 is in its uppermost position as illustrated in FIG. 2, there is communication between the ports 14 and 15 on the one hand and the groove 17 on the other hand. This means that, for example, pressurized air inserted along the port 15 will have access to the port 14 through the groove 17, but only when the plunger 25 is in its raised position as illustrated in FIG. 2.

Conversely, when the plunger 25 is located in a position which is such that there is no direct communication between the groove 17 and the ports 14 and 15, then pressurized air admitted to the port 15 will not reach the port 14.

In FIG. 1, the numeral 22 designates the bottom of a pallet, constituting a weight pressing down on the plunger 25.

It is to be understood that the position shown in FIG. 1 is the normal "working" position of the plunger 25. The position of the weight, constituted by the pallet 78 of which the underside is shown at 22, is determined by the position of the slide rails 80. By admitting pressurized hydraulic or other fluid along the bore 13, so that it has access to the cylindrical chamber 20, an upward pressure is exerted on the plunger 25. However, it is not intended that the upward pressure be sufficient to raise the entire weight of the pallet 78 upwardly off the slide rails. As previously explained, the intention is merely to reduce the force by which the pallet 78 presses downwardly against the slide rails.

It is to be understood that a fluid other than a hydraulic fluid could be utilized for the main pressure fluid exerting an upward force on the plunger 25.

While it is preferred that air under pressure be utilized for the monitoring system (admitted to the ports 14 and 15), it will again be appreciated that other fluids could be utilized.

Figure 3:
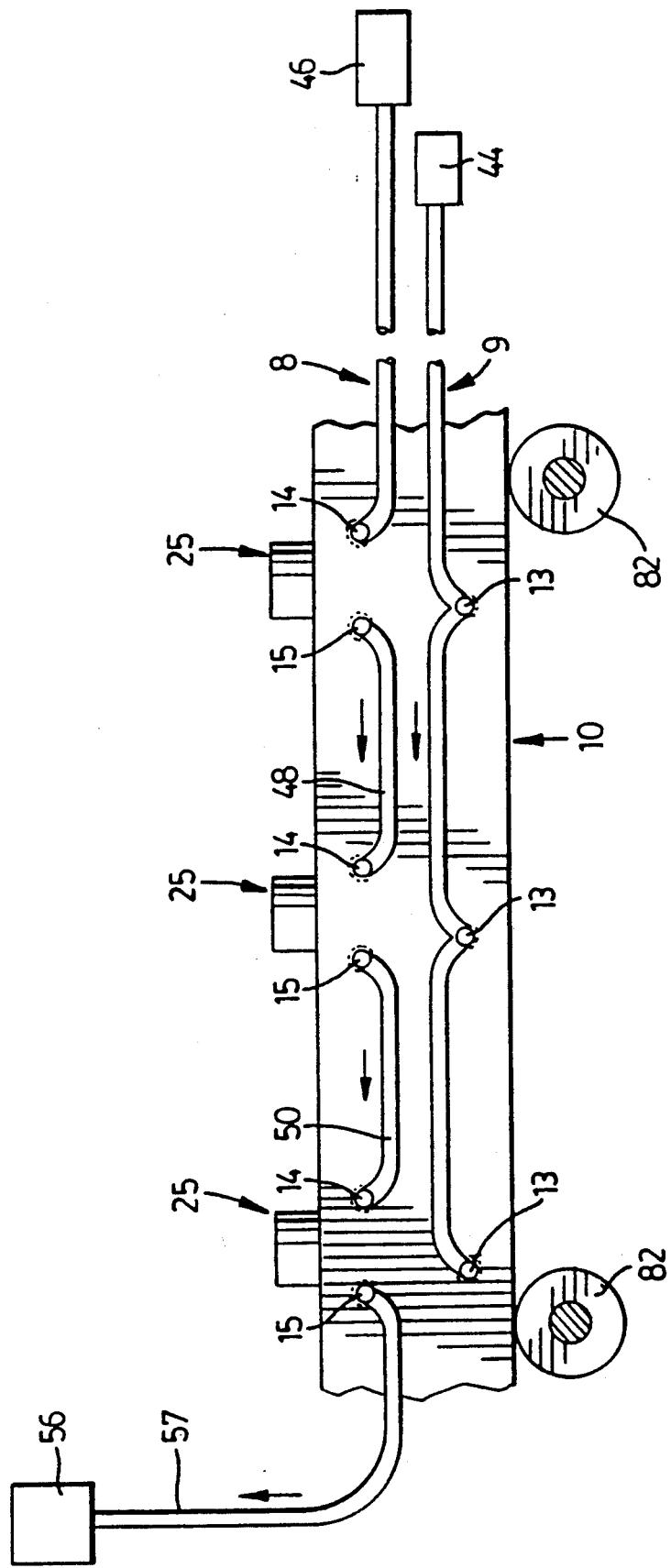
FIG. 3 is a somewhat schematic drawing showing the various fluid connections to the plunger assemblies of a transfer bar.

Attention is now directed to FIG. 3, wherein, in the particular embodiment illustrated, a hydraulic source 44, adjustable in pressure (for example from 0 to 55 psi), is connected to a pressure line 9 which runs to all of the bores 13 feeding the pressurized fluid to the cylindrical chambers 20 for the various plungers 25. In FIG. 3, the pressure line 9 runs sequentially to the different bores 13, however it will be understood that it would also be possible to provide separate lines from the hydraulic source 44 to each of the boreholes 13. It is not essential to hook them up sequentially.

Also shown in FIG. 3 is a source 46 of air under pressure (typically 60 psi and constant), this being connected to an air pressure line 8 which enters port 14 of a first one of the plungers 25. The port 15 of that first one of the plungers is connected by a line 48 to the port 14 of a second one of the plungers (the middle one shown in FIG. 3). Similarly, the port 15 of the middle one of the plungers 25 is connected by a line 50 to the port 14 of the third (leftward) plunger 25. Finally, the port 15 of the leftward plunger 25 is connected to a pressure-sensitive switch 56 by a line 57.

The circles 82 are the lift wheels (see FIG. 4) which raise the transfer bar 10 upwardly during the time when the pallet is being moved along the slide rails 80.

The pressure-sensitive switch 56 is normally open, but when a preset pressure is reached, the switch will close and signal to the operator that all plungers are functioning.

During a normal machine cycle, the plungers 25 will be forced downwardly by the pallet weight, and any pressurized air in the grooves 17 and ports 14, 15 will leak out along the clearance between the plungers 25 and the respective cylinders (cylindrical chambers 20). This leak acts as a purge for coolant as well as the means for resetting the pressure switch to open.

Failure is detected when any plunger fails to rise completely when the transfer bar is lowered, since in such case the air pressure switch will not be closed. If the operator finds the switch open for several cycles, he will know that one or more of the plungers is malfunctioning and he will then carry out a visual inspection. If necessary, the faulty plunger can be cleaned and reassembled.

While one embodiment of this invention is illustrated in the accompanying drawings and described hereinabove, it will be evident to those skilled in the art that changes and modifications may be made therein without departing from the essence of this invention, as set forth in the appended claims.

The Embodiments of the Invention in Which an Exclusive Property or Privilege is claimed are Defined as Follows:

1. For use with an automated machine tool assembly in which a plurality of work stations are interconnected by slide rails on which can slide a pallet to which a workpiece is affixed, and at least one transfer bar with means for engaging the pallet and sliding the pallet the slide rails longitudinally thereof, a hydraulic lift and monitoring system which comprises:
   a plurality of hydraulic cylinders provided as part of said transfer bar,
   in each cylinder a plunger of which a portion extends above the top of the transfer bar and is adapted to contact a pallet,
   a first source of fluid under pressure,
   conduit means ducting fluid from said first source to all said cylinders, said fluid acting to urge the plungers upwardly,
   a second source of fluid under pressure,
   pressure detecting means,
   passageway means linking said second source through all said cylinders in series and finally to said pressure detecting means in such a way that, when all the plungers are at or above a predetermined vertical position, pressurized fluid from said second source is available at the pressure detecting means, and when one or more plungers fail to reach said predetermined vertical position, pressurized fluid from said second source fails to reach said pressure detecting means.

2. The improvement claimed in claim 1, in which each plunger is substantially cylindrical and incorporates an annular groove in its outer periphery, the transfer bar having, for each cylinder, a first passage communicating with the cylinder at a first peripheral location and a second passage communicating with the cylinder at a second peripheral location, said locations being at substantially the same axial location but displaced from each other peripherally, so that, when the respective plunger is at or above said predetermined vertical position, said groove links the first and second passages, and, when the respective plunger is below said predetermined vertical position, said groove fails to link the first and second passages, the second source of fluid under pressure being in communication with the first passage of one cylinder, the second passage of said one cylinder being in communication with the first passage of another cylinder, and so on with the second passage of a final cylinder being in communication with said pressure detecting means.

3. The improvement claimed in claim 1, in which said passageway means comprises two ports opening into each cylinder at peripherally separated locations, and groove means in each plunger which links the two respective ports when the plunger is at or above said predetermined vertical position, but fails to link said ports when the plunger is below said predetermined vertical position.

4. The improvement claimed in claim 3, which incorporates means for limiting the upward movement of each plunger, and 0-ring sealing means for preventing escape of the fluid from the first source, the clearance between each plunger and its respective cylinder being such as to allow fluid from said second source to leak away from said grooves by escaping between each plunger and the respective cylinder.

5. The improvement claimed in claim 1, in which the fluid from said first source is hydraulic fluid, the pressure of said first source being adjustable.

6. The improvement claimed in claim 2, in which the fluid from said first source is hydraulic fluid, the pressure of said first source being adjustable.

7. The improvement claimed in claim 3, in which the fluid from said first source is hydraulic fluid, the pressure of said first source being adjustable.

8. The improvement claimed in claim 4, in which the fluid from said first source is hydraulic fluid, the pressure of said first source being adjustable.

9. The improvement claimed in claim 1, in which the fluid from said first source is hydraulic fluid, the pressure of said first source being adjustable, the fluid from the second source being pressurized air.

10. The improvement claimed in claim 2, in which the fluid from said first source is hydraulic fluid, the pressure of said first source being adjustable, the fluid from the second source being pressurized air.

11. The improvement claimed in claim 3, in which the fluid from said first source is hydraulic fluid, the pressure of said first source being adjustable, the fluid from the second source being pressurized air.

12. The improvement claimed in claim 4, in which the fluid from said first source is hydraulic fluid, the pressure of said first source being adjustable, the fluid from the second source being pressurized air.

13. An automated machine tool assembly with a hydraulic lift and monitoring system, the assembly comprising:
   a plurality of work stations,
   slide rails interconnecting said work stations,
   at least one pallet slideable on said slide rails, said at least one pallet being such that a workpiece can be affixed thereto,
   at least one transfer bar with means for engaging the pallet and sliding the pallet on the slide rails longitudinally thereof,
   a plurality of hydraulic cylinders provided as part of said transfer bar
   in each cylinder a plunger of which a portion extends above the top of the transfer bar and is adapted to contact a pallet,
   a first source of fluid under pressure,
   conduit means ducting fluid from said first source to all said cylinders, said fluid acting to urge the plungers upwardly,
   a second source of fluid under pressure,
   pressure detecting means,
   passageway means linking said second source through all said cylinders in series and finally to said pressure detecting means in such a way that, when all the plungers are at or above a predetermined vertical position, pressurized fluid from said second source is available at the pressure detecting means, and when one or more plungers fail to reach said predetermined vertical position, pressurized fluid from said second source fails to reach said pressure detecting means.

14. The assembly claimed in claim 13, in which each plunger is substantially cylindrical and incorporates an annular groove in its outer periphery, the transfer bar having, for each cylinder, a first passage communicating with the cylinder at a first peripheral location and a second passage communicating with the cylinder at a second peripheral location, said locations being at substantially the same axial location but displaced from each other peripherally, so that, when the respective plunger is at or above said predetermined vertical position, said groove links the first and second passages, and, when the respective plunger is below said predetermined vertical position, said groove fails to link the first and second passages, the second source of fluid under pressure being in communication with the first passage of one cylinder, the second passage of said one cylinder being in communication with the first passage of another cylinder, and so on with the second passage of a final cylinder being in communication with said pressure detecting means.

15. The assembly claimed in claim 13, in which said passageway means comprises two ports opening into each cylinder at peripherally separated locations, and groove means in each plunger which links the two respective ports when the plunger is at or above said predetermined vertical position, but fails to link said ports when the plunger is below said predetermined vertical position.

16. The assembly claimed in claim 15, which incorporates means from limiting the upward movement of each plunger, and 0-ring sealing means for preventing escape of the fluid from the first source, the clearance between each plunger and its respective cylinder being such as to allow fluid from said second source to leak away from said grooves by escaping between each plunger and the respective cylinder.

17. The improvement claimed in claim 13, in which the fluid from said first source is hydraulic fluid, the pressure of said first source being adjustable.

18. The improvement claimed in claim 14, in which the fluid from said first source is hydraulic fluid, the pressure of said first source being adjustable.

19. The improvement claimed in claim 15, in which the fluid from said first source is hydraulic fluid, the pressure of said first source being adjustable.

20. The improvement claimed in claim 16, in which the fluid from said first source is hydraulic fluid, the pressure of said first source being adjustable.

21. The improvement claimed in claim 13, in which the fluid from said first source is hydraulic fluid, the pressure of said first source being adjustable, the fluid from the second source being pressurized air.

22. The improvement claimed in claim 14, in which the fluid from said first source is hydraulic fluid, the pressure of said first source being adjustable, the fluid from the second source being pressurized air.

23. The improvement claimed in claim 15, in which the fluid from said first source is hydraulic fluid, the pressure of said first source being adjustable, the fluid from the second source being pressurized air.

24. The improvement claimed in claim 16, in which the fluid from said first source is hydraulic fluid, the pressure of said first source being adjustable, the fluid from the second source being pressurized air.

* * * * *